Patented Mar. 8, 1938

2,110,847

UNITED STATES PATENT OFFICE 2,110,847

PROCESS FOR BREAKING PETROLEUM EMULSIONS

Melvin De Groote, St. Louis, Mo., assignor to The Tret-O-Lite Company, Webster Groves, Mo., a corporation of Missouri No Drawing. Application June 21, 1937,
Serial No. 149,469

9 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottom of oil storage tanks, and are commonly referred to as "cut oil", "roily oil", "emulsified oil" and "bottom settlings".

The object of my invention is to provide a novel and inexpensive process for separating emulsions of the character referred to into their component parts of oil and water or brine.

Briefly described, my process consists in subjecting a petroleum emulsion of the water-in-oil type to the action of a treating agent or demulsifying agent of the kind hereinafter described, thereby causing the emulsion to break down and separate into its component parts of oil and water or brine, when the emulsion is permitted to remain in a quiescent state after treatment, or is subjected to other equivalent separatory procedures.

The treating agent or demulsifying agent contemplated for use in my process consists of or comprises a compound of the general formula type

R—O—T where R represents an aromatic, alicyclic, or hydroaromatic hydrocarbon radical containing as a constituent at least one aliphatic, aralkyl, alicyclic, or cycloaliphatic radical having at least three carbon atoms, and T represents an aliphatic hydrocarbon radical subject to certain variation as hereinafter described. T is further characterized by the fact that there is attached thereto at least one acidic radical capable of salt formation selected from the group comprising carboxyl radicals, acid sulfate radicals, sulfonic acid radicals, and phosphoric acid radicals. T, exclusive of the acid-forming radicals, may contain not over 40 carbon atoms.

Products of this kind are well known compositions and may be prepared in various manners.

As raw material for the manufacture of these compounds, one may use alkylated, aralkylated, or cycloalkylated, aromatic, alicyclic, or hydroaromatic oxy compounds. Examples of such raw materials include para-n-butylphenol, isoamyl-cresols, isohexylxylenols, isododecylnaphthols, ortho- and para-benzyl-phenol, para-cyclohexyl-phenol, as well as the alkylated or cycloalkylated hydroaromatic alcohols obtainable from the said substances by nuclear hydrogenation.

By causing these aromatic or hydroaromatic hydroxy compounds to react with halogen-fatty acids or halogen-alkyl-sulphonic acids there are obtained the compounds of the above general formula. They may also be prepared by causing the said hydroxyl compounds to react with halogen-hydrins of polyhydric aliphatic alcohols, or with alkylene oxides and transforming, by means of a polybasic mineral acid containing oxygen, such as sulfuric acid or phosphoric acid, the introduced hydroxyl group into the acid ester.

Known examples of this type of compound include the following:

(A)

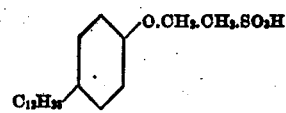

Para-n-dodecylphenoxethanesulfonic acid (B)

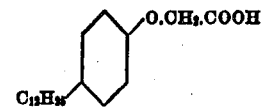

Para-dodecylphenoxyacetic acid (C)

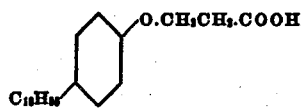

Para-oleyl-phenoxy-propionic acid

Octylxylenyloxypropyl ether sulfonic acids which are obtainable by the reaction of the sodium salts of octylxylenols with chlorooxypropanesulfonic acid, and which may be indicated by the formula:

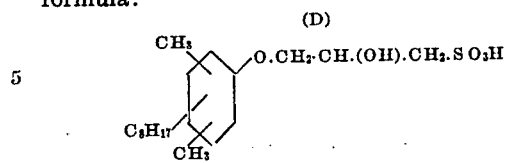

If instead of using a mixture of octylxylenols, one employs a mixture of iso-octyl-hexahydroxylenols, then there are obtained iso-octyl hexahydroxylenyloxypropyl ether sulfonic acids. The free acids have the formula:

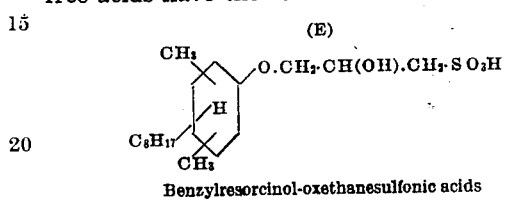

Benzylresorcinol-oxethanesulfonic acids

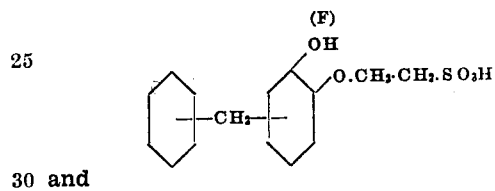

and

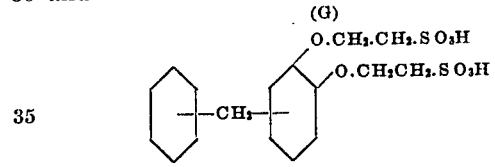

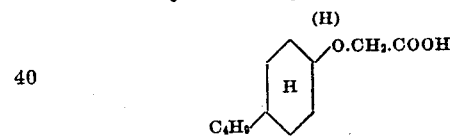

Para-butylcyclo-hexyloxy-acetic acid

Acid sulfuric acid ester of the butyl-cyclo-hexylglycol ether which has the formula:

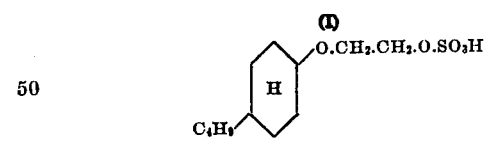

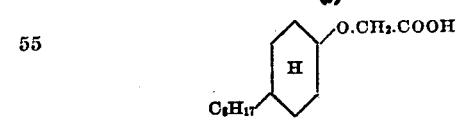

Octylcyclohexyloxy-acetic acid

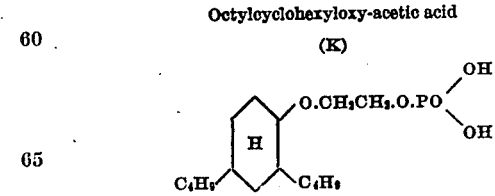

Acid phosphoric acid ester of dibutyl-cyclohexylglycol ether

The examples illustrated above are representative of but a few of the various types of materials contemplated for use as demulsifying agents in the present process. It is obvious that where examples have shown a monocyclic structure, similar reagents could be obtained from the corresponding naphthols in place of the corresponding monocyclic phenols. Similarly, one might obtain compounds from polycyclic hydroxy bodies other than naphthalene compounds, such as derivatives of anthracene, phenanthrene, etc. Instead of derivatives of phenols and naphthols, for example, one might employ the hydroaromatic bodies, such as dihydrophenol, tetrahydronaphthol, etc. One might employ the alicyclic hydroxy materials such as hexahydrophenol, completely hydrogenated cresols, completely hydrogenated xylenols, completely hydrogenated naphthols, etc. Materials comparable to partially or totally hydrogenated benzyl alcohol may be employed. In addition to the substitution of alkyl groups in the phenols or in the naphthols, one may use other radicals as previously indicated, as in benzyl phenol, benzyl naphthol, cyclohexyl phenol, etc.

In the illustrations previously referred to, the product is shown in the acidic form, that is, as having at least one ionizable hydrogen atom. The compounds may be used in the acidic state, but in order to prevent corrosion, it is usually desirable that the free acidic hydrogen be replaced by a suitable organic radical or by a metallic atom or by an ammonium radical or by a substituted ammonium radical (amine radical). For instance, such ionizable hydrogen atom may be replaced by an alkyl radical derived from a monohydric alcohol, such as methyl alcohol, ethyl alcohol, propyl alcohol, butyl alcohol, amyl alcohol, hexyl alcohol, etc. The material may be neutralized with any suitable base, such as caustic soda, caustic potash, ammonia, propanolamine, dipropanolamine, tripropanolamine, triethanolamine, diethanolamine, benzylamine, morpholine, amylamine, diamylamine, triamylamine, cyclohexylamine, or the like. One may likewise prepare polyvalent metallic salts, such as iron salts, copper salts, lead salts, calcium salts, magnesium salts, etc. Furthermore, such ionizable hydrogen atom may be replaced by a residue derived from various polyhydric alcohols. Such polyhydric alcohols may be aliphatic, aromatic, alicyclic, aralkyl, heterocyclic, etc. Suitable polyhydric alcohols include ethylene, glycol, glycerol, and the polyhydric alcohol ethers, such as diethylene glycol, diglycerol, etc.

In the foregoing examples, the aliphatic radical to which the acidic radical is attached and indicated by T is of such a kind that the carbon atom to carbon atom chain is uninterrupted. It is obvious that an interrupted hydrocarbon chain would function in the same manner as an uninterrupted hydrocarbon chain. For instance, an interrupted carbon chain having the linkages $$-C-O-C-$$
$$-C-S-C-$$
$$-C-N\begin{matrix}C-\\C-\end{matrix}$$

and $$-C-\underset{H}{N}-C-$$

would act in the same manner as the $$-C-C-C-$$

linkage. Various methods for producing compounds of this particular type are well known, and for sake of brevity, reference will be made to English Patent 452,866, to I. G. Farbenindustrie Aktion-Gesellschaft, dated February 27, 1936.

Among the various compounds there described are the following:

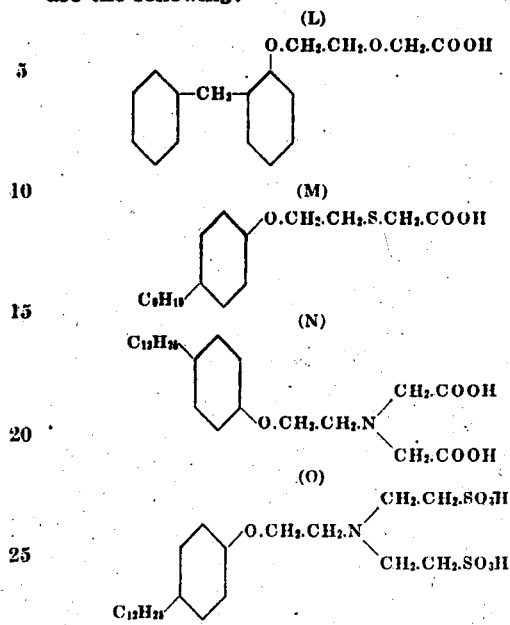

Although not described in said British patent, one could prepare a compound indicated by the formula

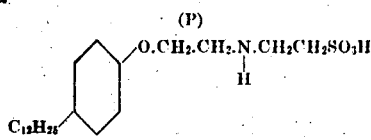

It is obvious, of course, that similar compounds can be derived from polycyclic material instead of monocyclic materials. In other words, where substituted phenols are employed, they may be replaced by substituted naphthols.

In view of what has been said previously, the earlier description of the demulsifying agent employed in the present process may be fully described to the extent that one may say that in its broadest phase T represents an aliphatic hydrocarbon radical or an interrupted aliphatic hydrocarbon radical in which the carbon to carbon atom chain is interrupted by the presence of a sulfur atom, a nitrogen atom, or an oxygen atom.

Where an alkyl group such as a propyl group is introduced into the nucleus, one might introduce an interrupted carbon chain compound instead of a homo-atomic chain. Similarly, instead of a naphthyl compound, one might employ a chlornaphthyl compound. Briefly stated, these various facts may be summarized as follows:

Substituted alkyl radicals or residues or substituted aromatic nuclei may be employed where (1) the presence of the substituent does not prevent the desired reactions from taking place; (2) does not promote some other undesirable reaction; (3) does not prevent the substituted hydrocarbon chain or interrupted hydrocarbon chain or substituted nucleus from acting in the same manner as the unsubstituted nucleus or uninterrupted chain, that is, does not prevent the radical or residue from functioning as the equivalent of the unsubstituted alkyl radical or as an uninterrupted chain.

My preferred reagent consists of the sodium salt of cyclo-hexyl-naphthoxy-ethane-sulfonic acid. This product can be obtained in various manners, but is preferably obtained by condensing cyclohexanol with beta naphthol and subsequently reacting the condensation product with chlorethane sulfonic acid in the presence of alkali. The advantage of this particular reagent is that cyclohexanol and beta naphthol are fairly cheap, and hydroxy ethane sulfonic acid is available at reasonably low cost, in view of its manufacture from carbyl sulfate. Such completed sulfonic acid may be neutralized in any suitable manner, although simply as a matter of economy, I prefer to neutralize it with caustic soda, so as to produce the sodium salt. The oil solubility of the product can be greatly increased by neutralization with a rather high molecular weight amine, such as cyclohexylamine, monoamylamine, benzylamine, and the like.

It is to be noted that some of the demulsifying agents of the kind described may be water soluble and substantially oil insoluble. In other instances, where the heavy metal salt is formed or where a high molecular weight amine is used for neutralization, such as triamylamine, the resultant product may be water insoluble and oil soluble. In other instances, the product may show solubility in both oil and water, and in some instances rather limited solubility in either oil or water.

Conventional demulsifying agents employed in the treatment of oil field emulsions are used as such, or after dilution with any suitable solvent, such as water, petroleum hydrocarbons, such as gasoline, kerosene, stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the chemical compound employed as the demulsifying agent of my process may be admixed with one or more of the solvents customarily used in connection with conventional demulsifying agents. Moreover, said chemical compound may be used alone or in admixture with other suitable well known classes of demulsifying agents, such as demulsifying agents of the modified fatty acid type, the petroleum sulfonate type, the alkylated sulfo-aromatic type, etc.

It is well known that conventional demulsifying agents may be used in a water-soluble form, or in an oil-soluble form, or in a form exhibiting both oil and water solubility. Sometimes they may be used in a form which exhibits relatively limited water solubility and relatively limited oil solubility. However, since such reagents are sometimes used in a ratio of 1 to 10,000 or 1 to 20,000, or even 1 to 30,000, such an apparent insolubility in oil and water is not significant, because said reagents undoubtedly have solubility within the concentration employed. This same fact is true in regard to the material or materials employed as the demulsifying agent of my process.

In practicing my process a treating agent or demulsifying agent of the kind above described is brought into contact with or caused to act upon the emulsion to be treated, in any of the various ways or by any of the various apparatus now generally used to resolve or break petroleum emulsions with a chemical reagent, the above procedure being used either alone or in combination with other demulsifying procedure, such as the electrical dehydration process.

It is understood that the use of this process is not limited to any particular isomeric form of the chemical compound or compounds disclosed, but that one isomeric form is as suitable as another.

I desire to point out that the superiority of the reagent used as the demulsifying agent in my process is based upon its ability to treat certain emulsions more advantageously and at a somewhat lower cost than is possible with other demulsifiers, or conventional mixtures thereof. It is believed that the particular demulsifying agent or treating agent herein described will find comparatively limited application so far as the majority of oil field emulsions are concerned; but I have found that such a demulsifying agent has commercial value, as it will economically break or resolve certain oil field emulsions in a number of cases which cannot be treated as easily or at so low a cost with the demulsifying agents heretofore available.

Having thus described my invention, what I claim as new and desire to secure by Letters Patent is:

1. A process for breaking petroleum emulsions of the water-in-oil type, which consists in subjecting the emulsion to the action of a demulsifying agent comprising a compound of the general formula type R—O—T, in which R represents an aromatic, alicyclic, or hydroaromatic hydrocarbon radical, said radical containing as a constituent thereof, at least one aliphatic, aralkyl, alicyclic, or cycloaliphatic radical having at least three carbon atoms; and T represents an aliphatic hydrocarbon radical or interrupted hydrocarbon radical in which the carbon atom chain is interrupted by an atom selected from the class consisting of oxygen, sulfur, and nitrogen; and T is additionally characterized by the fact that there is attached thereto at least one acidic radical capable of salt formation selected from the class consisting of carboxyl radicals, acid sulfate radicals, sulfonic acid radicals, and phosphoric acid radicals; and T is further characterized by the fact that, exclusive of the acid-forming radicals, there are present not over forty carbon atoms.

2. A process for breaking petroleum emulsions of the water-in-oil type, which consists in subjecting the emulsion to the action of a demulsifying agent comprising a compound of the general formula type R—O—T, in which R represents an aromatic hydrocarbon radical, said radical containing as a constituent thereof, at least one aliphatic, aralkyl, alicyclic, or cycloaliphatic radical having at least three carbon atoms; and T represents an aliphatic hydrocarbon radical or interrupted hydrocarbon radical in which the carbon atom chain is interrupted by an atom selected from the class consisting of oxygen, sulfur, and nitrogen; and T is additionally characterized by the fact that there is attached thereto at least one acidic radical capable of salt formation selected from the class consisting of carboxyl radicals, acid sulfate radicals, sulfonic acid radicals, and phosphoric acid radicals; and T is further characterized by the fact that, exclusive of the acid-forming radicals, there are present not over 40 carbon atoms.

3. A process for breaking petroleum emulsions of the water-in-oil type, which consists in subjecting the emulsion to the action of a demulsifying agent comprising a compound of the general formula type R—O—T, in which R represents an aromatic hydrocarbon radical, said radical containing as a constituent thereof, at least one aliphatic radical having at least three carbon atoms; and T represents an aliphatic hydrocarbon radical or interrupted hydrocarbon radical in which the carbon atom chain is interrupted by an atom selected from the class consisting of oxygen, sulfur, and nitrogen; and T is additionally characterized by the fact that there is attached thereto at least one acidic radical capable of salt formation selected from the class consisting of carboxyl radicals, acid sulfate radicals, sulfonic acid radicals, and phosphoric acid radicals; and T is further characterized by the fact that, exclusive of the acid-forming radicals, there are present not over forty carbon atoms.

4. A process for breaking petroleum emulsions of the water-in-oil type, which consists in subjecting the emulsion to the action of a demulsifying agent comprising a compound of the general formula type R—O—T, in which R represents an aromatic hydrocarbon radical, said radical containing as a constituent thereof, at least one aliphatic radical having at least three carbon atoms; and T represents an aliphatic hydrocarbon radical or interrupted hydrocarbon radical in which the carbon atom chain is interrupted by an atom selected from the class consisting of oxygen, sulfur, and nitrogen; and T is additionally characterized by the fact that there is attached thereto at least one sulfonic acid radical; and T is further characterized by the fact that, exclusive of the acid-forming radicals, there are present not over forty carbon atoms.

5. A process for breaking petroleum emulsions of the water-in-oil type, which consists in subjecting the emulsion to the action of a demulsifying agent comprising a compound of the general formula type R—O—T, in which R represents an aromatic hydrocarbon radical, said radical containing as a constituent thereof, at least one aliphatic radical having at least three carbon atoms; and T represents an aliphatic hydrocarbon radical or interrupted hydrocarbon radical in which the carbon atom chain is interrupted by an atom selected from the class consisting of oxygen, sulfur, and nitrogen; and T is additionally characterized by the fact that there is attached thereto at least one sulfonic acid radical; and T is further characterized by the fact that, exclusive of the acid-forming radicals, there are present not over ten carbon atoms.

6. A process for breaking petroleum emulsions of the water-in-oil type, which consists in subjecting the emulsion to the action of a demulsifying agent comprising a compound of the general formula type R—O—T, in which R represents a monocyclic aromatic hydrocarbon radical, said radical containing as a constituent thereof, at least one aliphatic radical having at least three carbon atoms; and T represents an aliphatic hydrocarbon radical or interrupted hydrocarbon radical in which the carbon atom chain is interrupted by an atom selected from the class consisting of oxygen, sulfur, and nitrogen; and T is additionally characterized by the fact that there is attached thereto at least one sulfonic acid radical; and T is further characterized by the fact that, exclusive of the acid-forming radicals, there are present not over ten carbon atoms.

7. A process for breaking petroleum emulsions of the water-in-oil type, which consists in subjecting the emulsion to the action of a demulsifying agent in the form of a salt, comprising a compound of the general formula type R—O—T, in which R represents a monocyclic aromatic hydrocarbon radical, said radical containing as a constituent thereof, at least one aliphatic radical having at least three carbon atoms; and T represents an aliphatic hydrocarbon radical or interrupted hydrocarbon radical in which the carbon atom chain is interrupted by an atom selected from the class consisting of oxygen, sulfur, and nitrogen; and T is additionally characterized by the fact that there is attached thereto at least one sulfonic acid radical; and T is further characterized by the fact that, exclusive of the acid-forming radicals, there are present not over ten carbon atoms.

8. A process for breaking petroleum emulsions of the water-in-oil type, which consists in subjecting the emulsion to the action of a demulsifying agent in the form of a water soluble salt, comprising a compound of the general formula type R—O—T, in which R represents a monocyclic aromatic hydrocarbon radical, said radical containing as a constituent thereof, at least one aliphatic radical having at least three carbon atoms; and T represents an aliphatic hydrocarbon radical or interrupted hydrocarbon radical in which the carbon atom chain is interrupted by an atom selected from the class consisting of oxygen, sulfur, and nitrogen; and T is additionally characterized by the fact that there is attached thereto at least one sulfonic acid radical; and T is further characterized by the fact that, exclusive of the acid-forming radicals, there are present not over ten carbon atoms.

9. A process for breaking petroleum emulsions of the water-in-oil type, which consists in subjecting the emulsion to the action of a demulsifying agent in the form of a water soluble ammonium salt, comprising a compound of the general formula type R—O—T, in which R represents a monocyclic aromatic hydrocarbon radical, said radical containing as a constituent thereof, at least one aliphatic radical having at least three carbon atoms; and T represents an aliphatic hydrocarbon radical or interrupted hydrocarbon radical in which the carbon atom chain is interrupted by an atom selected from the class consisting of oxygen, sulfur, and nitrogen; and T is additionally characterized by the fact that there is attached thereto at least one sulfonic acid radical; and T is further characterized by the fact that, exclusive of the acid-forming radicals, there are present not over ten carbon atoms.

MELVIN DE GROOTE.